3,493,406
GELLING REAGENTS FOR SOLUBLE
SILICATES
Pierre Fillet, Paris, and Bernard Bonnel, Lyon, France,
assignors to Progil de Miromesnil, Paris, France, a corporation of France
No Drawing. Filed Nov. 29, 1966, Ser. No. 597,530
Claims priority, application France, Dec. 28, 1965,
46,761
Int. Cl. E02d 3/14, 3/00; C04b 7/00
U.S. Cl. 106—74          7 Claims

ABSTRACT OF THE DISCLOSURE

Succinic acid diesters are used as gelling agents for alkali metal silicates in soil stabilization.

---

The present invention relates to a new gelling reagent for alkali metal silicates, and more particularly to new compositions containing silica gels which are transformable into a coherent and hard mass, as well as to the use of these gels for soil consolidation and stabilization.

It is known that by adding some organic reagents to alkali metal silicates, it is possible to obtain silica gels capable of being transformed into a hard mass having cement-like characteristics. Among the numerous reagents which have been suggested heretofore are fatty acids, phenols, esters of organic monoacids such as ethyl acetate, amides of aliphatic acids such as formamide, alkali metal bicarbonates, esters of polyols such as diacetine or triacetine or mixtures of several of these products.

It has now been found that succinic acid diesters are very good gelling agents for alkali metal silicates, the efficiency of which is generally greater than that of the already known mono-alkyl-esters, as for example ethyl acetate, and then the esters of polyols, containing at least a free hydroxyl group, as for example diacetine.

The diesters usable according to the present invention are dialkyl succinates in which each alkyl radical may contain 1 to 5 carbon atoms, such as, for example: methyl, ethyl, propyl, butyl, isobutyl, etc.

However it is especially advantageous to use dimethyl succinate which has the advantage of good water solubility.

The diesters according to the invention may be used by themselves or in mixture with other gelling reagents of a known type such, for example, as ethyl acetate, ethyl-glycol acetate, diacetine, triacetine, etc.

The alkali metal silicates capable of being gelled according to the invention may be sodium, potassium or lithium silicates or polysilicates, in which the molecular ratio of $SiO_2/M_2O$ is between 2.0 and 5.0 and, preferably 3.4 to 5. (M=alkali metal.) They are normally used in the form of aqueous solutions titrating 25 to 40% of dry extract, such as, for example sodium silicate solutions titrating 31 to 34° Baumé (at 20° C.).

The relative ratios of succinic diester and alkali metal silicate may vary between large limits. However, the preferred proportions of dialkyl succinate are from 5 to 50 parts by weight (dry extract) for 100 parts of alkali metal silicate (dry extract). Moreover, when the dialkyl succinate is used in combination with another gelling agent of a known type, the respective ratios of the two gelling reagents in the mixture may be very large, for example 100 to 60 parts by weight of succinate for 0 to 40 parts of the other reagent.

A convenient method to express constituent relative quantities in the compositions according to the invention consists of using the ratios:

$$a = \frac{\text{reagent weight}}{\text{silicate volume}} \qquad b = \frac{\text{water volume}}{\text{silicate volume}}$$

The variation of these ratios evidently has an influence on the characteristics of the gels it is desired to obtain. The characteristics recognized as being the most important ones are: gelling time resistance to compression, sensitiveness to water and viscosity of the mixture of silicate and reagent as well as the variation of viscosity with time. It is generally desirable that the gelling time be neither lower than 10 to 15 minutes nor greater than 1 hour, with a time of approximately 30 to 50 minutes being considered as a good average. With respect to the resistance to compression, figures of between 10 and 30 kg./cm.$^2$ are considered to be good characteristics. Finally the initial viscosity of the mixture of silicate/gelling agent must be low, preferably lower than 5 centiposises (at 20° C.) that is near the viscosity of water. Moreover it must increase with time in a manner that is slow enough to allow, during consolidation of soils, injection operations and cleaning of the apparatus before irreversible gelling.

To obtain these characteristics, when the diester used is dimethyl succinate the ratios of $a$ of between 0.02 and 0.15 and of $b$ of between 0.4 and 2 are used. It has been established that the three pre-cited gel characteristics had their optimum values when $b$ varied between 0.6 and 1 (little diluted silicate) while $a$ was maintained between 0.04 and 0.12. Under such conditions, the gelling times may vary between 5 and 125 minutes, compression resistances are greater than 10 kg./cm.$^2$ and viscosities, ranging about 2 to 6 centipoises immediately after introducing the reagent(s) in the silicate, increase slowly at first, and then assume high values immediately before gel formation.

The new compositions according to the present invention may be prepared according to conventional methods of gelling alkali metal silicates. According to an especially advatnageous method of operation, the aqueous solution of the gelling reagent is introduced during a period of 1 to 2 minutes into the aqueous solution of alkali metal silicate maintained at room temperature, about 20° C.

The compositions obtained in that way are ready to be injected into the soils intended to be consolidated and/or stabilized. They are easy to handle and may be injected into especially dense soils, because of their weak initial viscosity, which is close to that of water. They give rise to the formation of extremely resistant gels, the compression resistance of which is often greater than 15 kg./cm.$^2$ and which are transformed into a hard and coherent mass, similar to cement.

The amount of such mixtures to be used according to the invention, with respect to soils to be treated, are of course variable according to the type of soil (clayey, sandy, etc.). However generally between 10 to 60% of the said composition are used with respect to the soil weight, that is about 1 to 10% calculated by the weight of the dry extract of the constituents according to the invention.

The following examples are illustrative only and should not be construed as limiting the scope of the invention.

EXAMPLE 1

Series of gels have been prepared by mixing, as explained hereinabove, aqueous solutions of sodium silicates at 31° Baumé, having variable ratios of $a$ and $b$, with aqueous solutions containing 10% of dimethyl succinate.

The used silicate had a molar ratio $SiO_2/Na_2O$ equal to 3.92.

Then the following characteristics of the obtained mixtures have been measured:

(a) Gelling time $Tp$, the time necessary in order that the surface of a container filled with gelling mixture and inclined to the horizontal position, does not show any more deformation.

(b) Resistance to compression R, measured by gel resistance to the sinking of a needle having a section of 1.18 cm.$^2$, this needle being connected to a dynamometric ring of 100 kg., on gels having been submitted to a 48 hours-aging and kept under 5 mm. of water.

(c) Viscosity V, measured at a temperature of 20° C. by means of the Epprecht viscosimeter of "Rheomat 15" type.

The obtained results are given in Table I hereinafter.

TABLE I

| Ratio b | Ratio a | Tp Minutes | R (kg./cm.$^2$) |
| --- | --- | --- | --- |
| 0.6 | 0.04 | 78 | 11.3 |
|  | 0.05 | 45 | 17.8 |
|  | 0.06 | 29 | 18.5 |
|  | 0.08 | 12 | 20.8 |
|  | 0.1 | 6 | 27.5 |
| 0.8 | 0.035 | 132 | 4.4 |
|  | 0.05 | 67 | 10.9 |
|  | 0.06 | 45 | 14.5 |
|  | 0.075 | 24 | 15.0 |
|  | 0.1 | 10 | 15.0 |
|  | 0.12 | 6 | 15.0 |
| 1. | 0.04 | 125 | 2.4 |
|  | 0.05 | 72 | 5.9 |
|  | 0.075 | 30 | 11.6 |
|  | 0.1 | 16 | 13.6 |
|  | 0.12 | 8 | 13.6 |
|  | 0.15 | 5 | 13.6 |

| Ratio b | Ratio a | Tp Minutes | R (kg./cm.$^2$) |
| --- | --- | --- | --- |
| 1.2 | 0.045 | 210 | 1.2 |
|  | 0.05 | 86 | 3.8 |
|  | 0.075 | 41 | 8.5 |
|  | 0.1 | 21 | 10.8 |
|  | 0.12 | 15 | 11.1 |
|  | 0.14 | 11 | 11 |
| 1.5 | 0.05 | 178 | 1.5 |
|  | 0.06 | 90 | 3 |
|  | 0.075 | 56 | 5.2 |
|  | 0.1 | 34 | 7.3 |
|  | 0.12 | 25 | 8.0 |
|  | 0.14 | 17 | 7.3 |
|  | 0.16 | 14 | 7.3 |
|  | 0.18 | 10 | 7.0 |

For the mixtures described in the table hereinabove, the initial viscosity of the gelled silicate solution varies between 1.5 and 5 centipoises. The viscosity of a composition having a molecular ratio $SiO_2/Na_2O = 3.92$ and for which $a = 0.06$ and $b = 0.8$ was 6 centipoises after 15 minutes and 10 centipoises after 34 minutes, gelling time being about 45 minutes.

As may be noted, the best results are obtained when a sodium silicate of high molecular ratio $SiO_2/Na_2O$ (equal to or upper than 3.90 is used) and a ratio $b$ (water volume/silicate volume) is chosen which is lower than or equal to 1. In this case the compression resistance of the gels reach as high as 28 kg./cm.$^2$. Moreover the gels obtained are extremely resistant to water action; some of them have been kept in water for more than one month, with a ponderal rate of degradation lower than 1%.

EXAMPLE 2

In order to show the consolidated power of the composition of a silicate and succinic diester on non-coherent materials, tests have been made on dry Fontainebleau sand.

For this, test-tubes having a diameter of 37.5 mm. and a height of 75 mm. have been filled with this sand. These test-tubes are submitted to a light vibration movement, without any compression, then the sand has been impregnated by capillarity with the gelling mixtures obtained according to Example 1. The quantity of gelling mixtures vary between 1 and 10% of the weight of sand (expressed in dry extract).

Then the test-tubes prepared in that way have been tightly shut in order to keep the mixtures sheltered from air. Compression resistance measures have been made respectively during 24, 48 and 72 hours after treatment.

The results obtained are given in the Table II hereunder.

TABLE II

| Ratio values | | Resistances (average), kg./cm.$^2$, after— | | |
| --- | --- | --- | --- | --- |
| a | b | 24 h. | 48 h. | 72 h. |
| 0.06 | 0.8 | 11.8 | 11.5 | 11.5 |
| 0.06 | 1 | 7.6 | 7 | 7.5 |
| 0.06 | 1.2 | 5.5 | 5.6 | 5.7 |
| 0.06 | 1.35 | 4.5 | 4.8 | 4.8 |
| 0.06 | 1.5 | 3.6 | 3.8 | 3.8 |

What is claimed as:
1. A composition of matter consisting essentially of (1) an aqueous solution of up to 40% alkali metal silicate and (2) a gelling agent for said silicate comprising a dialkyl succinate in which each alkyl radical has 1–5 carbon atoms, the respective weight ratios, as dry extracts, being 5–50 parts by weight of said gelling agent for 100 parts by weight of said alkali metal silicate.

2. A composition of matter according to claim 1, wherein the dialkyl succinate is dimethyl succinate.

3. A composition in accordance with claime 1, wherein said gelling agent comprises up to 40% by weight of another gelling agent.

4. A composition of matter in accordance with claim 1, wherein said alkali metal silicate has a molar ratio $SiO_2/M_2O$ between 2.0 and 5.0, wherein M is an alkali metal, said alkali metal silicate being selected from the group consisting of sodium, lithium and potassium silicates and polysilicates.

5. A composition of matter in accordance with claim 1, wherein said aqueous solution of alkali metal silicate comprises 25–40% by weight of dry alkali metal silicate.

6. A composition of matter in accordance with claim 5, further comprising additional water, said composition of matter being of low viscosity.

7. In a process for the consolidation and stabilization of soils by mixing with said soil a composition comprising an aqueous alkali metal silicate and a gelling agent for said silicate, so that a gel is formed within said soil, the improvement consisting essentially of:
    using the composition of claim 1, in a quantity of 1–10% as a dry extract with respect to the soil weight, together with additional water to provide a low viscosity composition, and
    effecting said mixing with the soil by injecting said low viscosity composition into said soil.

References Cited

UNITED STATES PATENTS 2,766,130  10/1956  Dietz _____ 106—74
2,809,118  10/1957  Keil _____ 106—84

JAMES E. POER, Primary Examiner

U.S. Cl X.R.

106—84, 287